US005691691A

United States Patent [19]

Merwin et al.

[11] Patent Number: 5,691,691
[45] Date of Patent: Nov. 25, 1997

[54] POWER-LINE COMMUNICATION SYSTEM USING PULSE TRANSMISSION ON THE AC LINE

[75] Inventors: Jeffrey D. Merwin, Buffalo Grove; John G. Konopka, Barrington, both of Ill.

[73] Assignee: Motorola, Inc., Schaumburg, Ill.

[21] Appl. No.: 779,194

[22] Filed: Jan. 6, 1997

[51] Int. Cl.⁶ .................................................. H04M 11/04
[52] U.S. Cl. ............................ 340/310.02; 340/310.03; 340/310.04; 340/310.07; 340/310.08; 307/90
[58] Field of Search .................... 340/310.02, 310.01, 340/310.03, 310.04, 310.07, 310.08; 307/89, 90

[56] References Cited

U.S. PATENT DOCUMENTS

| | | |
|---|---|---|
| 3,895,369 | 7/1975 | Ono et al. . |
| 4,216,543 | 8/1980 | Cagle et al. . |
| 4,218,655 | 8/1980 | Johnston et al. . |
| 4,218,769 | 8/1980 | Cagle . |
| 4,300,126 | 11/1981 | Gajjar . |
| 4,348,582 | 9/1982 | Budek . |
| 4,400,688 | 8/1983 | Johnston et al. . |
| 4,408,185 | 10/1983 | Rasmussen . |
| 4,418,333 | 11/1983 | Schwarzbach et al. ............ 340/310.01 |
| 4,462,113 | 7/1984 | Iwata ............................. 340/310.01 |
| 4,535,447 | 8/1985 | Rosanes et al. . |
| 4,835,517 | 5/1989 | van der Gracht et al. . |
| 4,845,466 | 7/1989 | Hariton et al. . |
| 4,990,908 | 2/1991 | Tung ............................. 340/310.01 |
| 5,066,939 | 11/1991 | Mansfield, Jr. .................. 340/310.01 |
| 5,210,518 | 5/1993 | Graham et al. . |
| 5,264,823 | 11/1993 | Stevens . |
| 5,452,344 | 9/1995 | Larson . |

Primary Examiner—Jeffery Hofsass
Assistant Examiner—Nina Tong
Attorney, Agent, or Firm—Gary J. Cunningham

[57] ABSTRACT

A power-line communication system (10) for use with a conventional AC source (12) having a hot wire (14) and a neutral wire (16). The communication system (10) includes a pulse transmitter (16) and at least one receiver (18) connected downstream from the pulse transmitter (16). The pulse transmitter (16) is coupled between the hot wire (14) of the AC source (12) and either the neutral wire (16) of the AC source (12) or earth ground. Each receiver (14) is coupled to the AC source (12). The pulse transmitter (16) includes a control circuit (30) for controlling the conduction of a shunt circuit (32) and sends messages to the receivers (20) by inducing momentary pulses in the AC voltage supplied by the AC source (12). The shunt circuit (32) includes a power switch (52) and an energy clamp circuit for limiting the amplitude and the duration of the current through the power switch (52) and the pulse induced in the AC line voltage. Each receiver (18) detects the momentary pulses and translates a given sequence of pulses into its corresponding message. In a preferred embodiment, the pulse transmitter (16) is used to send control commands to one or more controllable electronic ballasts (22) for powering fluorescent lamps (24).

20 Claims, 5 Drawing Sheets

POWER-LINE COMMUNICATION SYSTEM USING PULSE TRANSMISSION ON THE AC LINE

FIELD OF THE INVENTION

The present invention relates to the general subject of power-line communication systems and, in particular, to a power-line communication system using pulse transmission on the AC line.

BACKGROUND OF THE INVENTION

Power-line communication systems have, in recent years, become increasingly viewed employed as an attractive alternative to conventional hard-wired communication systems, which require dedicated communication wiring, and wireless systems, which involve complex and costly transmitter and receiver circuits. In power-line communication, the existing alternating current (AC) power wires serve as a transmission medium by which information is relayed from a transmitter or control station to one or more receivers or loads connected downstream from an AC source. Since no new wires are required to implement the function of communication, power-line communication systems greatly reduce the complexity and effort of installation, particularly in building retrofit applications in which it is highly desirable to be able to install an energy control system with little or no alteration of the existing electrical wiring.

Existing methods of power-line communication may be broadly classified into two groups—carrier-based and pulse-based. In carrier-based systems, a high frequency carrier wave is superimposed on the AC line voltage or AC line current waveforms. Carrier-based systems offer the advantage of a high transmission rate, as many bits of information may be encoded within each half cycle of the AC line voltage or current. An important disadvantage of such systems, however, is that compatibility problems arise due to the fact that existing AC line equipment, such as transformers, are designed to offer some degree of noise immunity to low frequency disturbances, but not to disturbances of a higher frequency. In order to make a carrier-based system more robust with regard to noise, one must resort to extensive measures, such as the addition of line filters to the existing AC system.

Pulse-based systems avoid the frequency compatibility problems inherent in carrier-based systems, but at the cost of a much lower transmission rate. Specifically, existing pulse-based systems are, at best, able to transmit only one pulse per half-cycle of the AC line source. Furthermore, due to limitations of the associated pulse transmission circuitry, the pulse is usually constrained to occur only at or near the zero crossings of the AC line voltage. This implies an extremely low transmission rate of only two bits per line cycle, which may be unacceptably slow in applications in which it is desired to transmit information to a relatively large number of downstream loads or receivers within a relatively short period of time. In addition, existing pulse methods possess several disadvantages, including complex transmitter and receiver circuitry, and high voltage, current, and power stresses on the power switch which serves as the key operative component of a pulse transmitter circuit.

Existing approaches to pulse transmission may be divided into two categories—series schemes and shunt schemes. In series schemes, an example of which is described in U.S. Pat. No. 5,264,823, the power switch is coupled in series with one wire of the AC source, and pulses are induced in the AC line current by momentarily opening the power switch such that the AC line current is momentarily interrupted. For the vast portion of the AC line voltage cycle, during which time no pulses are being induced in the AC line current, the power switch remains in the on-state and must be able to reliably handle all of the current supplied by the AC source to the receivers and loads connected downstream. Thus, the power switch must be rated for potentially high levels of current, particularly so in cases in which there are a large number of downstream loads, and must therefore also be able to tolerate significant on-state power dissipation. Furthermore, the power switch must be rated to withstand not only the full AC line voltage which appears across it while inducing pulses, but also any line voltage transients which may occur when it is in the off-state. This dictates the use of a physically large and very expensive power switch.

The power switch rating requirements are similarly quite demanding for shunt schemes in which the power switch is coupled in parallel with the AC line wires, an example of which is described in U.S. Pat. No. 4,348,582. Depending upon where in the line cycle the power switch is turned on, an extremely high peak current may flow through the switch. Consequently, in order to avoid the requirement of extremely high current and power ratings for the switch, existing shunt schemes operate with the constraint that the switch be turned on only at or near the zero crossings of the AC line voltage so as to limit the resulting current through the power switch to within reasonable limits. Furthermore, the power switch is subject to the full AC line voltage and is not protected from overvoltage conditions due to transients which frequently occur in the AC line voltage. Therefore, the power switch must be rated for extremely high voltages.

It is therefore apparent that a pulse transmission system which can be implemented with a simple pulse transmitter circuit, which is operable to transmit bits over a relatively wide portion of the AC line cycle, and therefore at a higher transmission rate than existing pulse methods, and which requires only a modestly rated power switch in the pulse transmitter would constitute a significant improvement over the prior art.

DETAILED DESCRIPTION OF THE PREFERRED EMBODIMENTS

Figure 1:
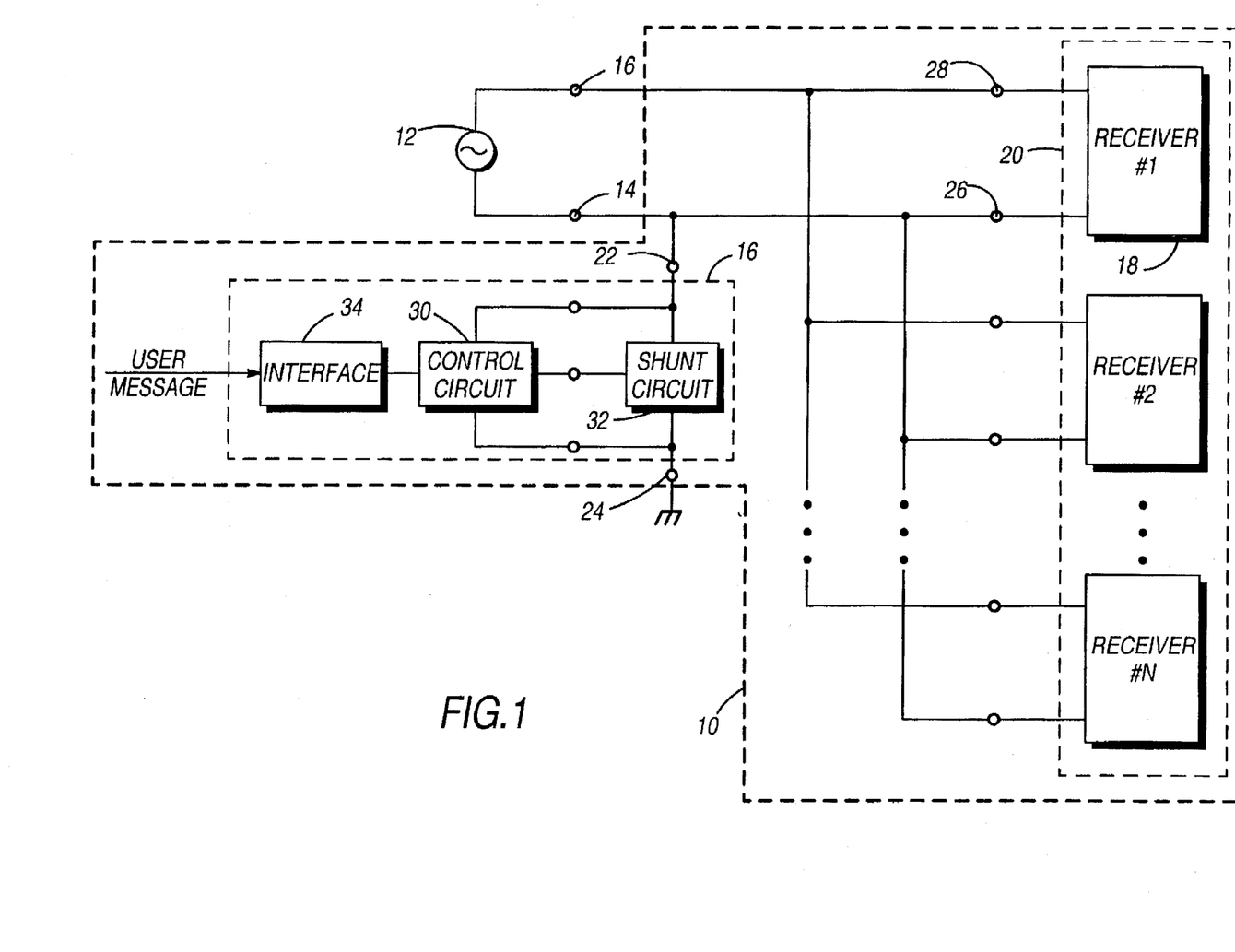
FIG. 1 is a block diagram of a power-line communication system, in accordance with the present invention.
Figure 2:
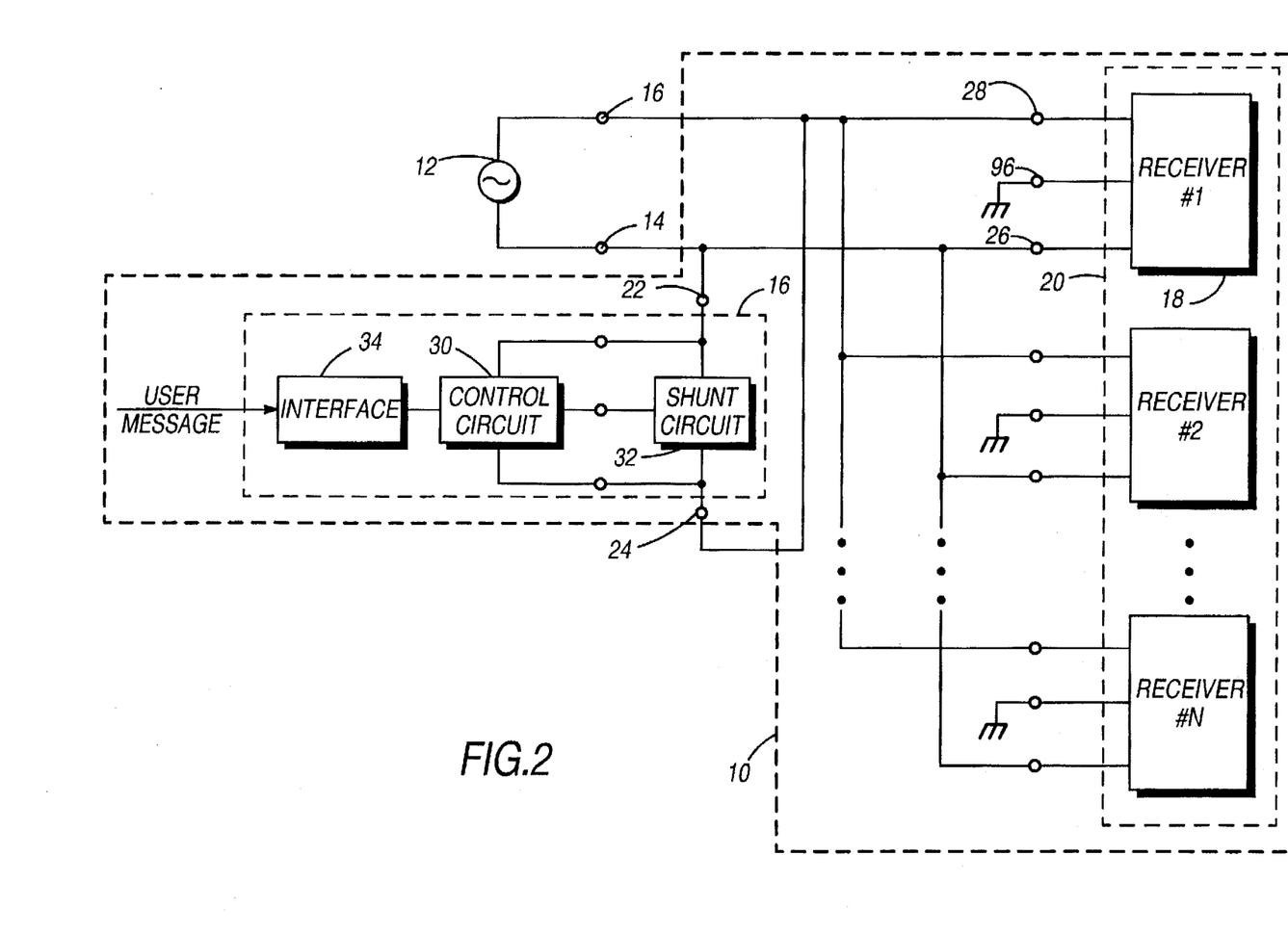
FIG. 2 is a diagram of a power-line communication system in which a pulse transmitter is coupled between the hot and neutral wires of an AC source, in accordance with the present invention.

A power-line communication system for use with a conventional alternating current (AC) source having a hot wire and a neutral wire is shown in FIG. 1 and FIG. 2. Referring to FIG. 1, the power-line communication system 10 includes a pulse transmitter 16 having a hot terminal 22 and a reference terminal 24, the hot terminal 22 being coupled to the hot wire 14 of an AC source 12 and the reference terminal 24 being connected to earth ground. Alternatively, as shown in FIG. 2, the reference terminal 24 of pulse transmitter 16 can be connected to the neutral wire 16 of the AC source 12. An AC voltage having a positive half cycle and a negative half cycle is present between the hot wire 14 and the neutral wire 16 of the AC source 12.

Turning again to FIG. 1, the pulse transmitter 16 includes a shunt circuit 32 that is coupled between the hot terminal 22 and the reference terminal 24, and a control circuit 30 for rendering the shunt circuit 32 conductive and non-conductive. When the shunt circuit 32 is conductive, a current having an amplitude and a duration flows between the hot terminal 22 and the reference terminal 24, the current being of sufficient amplitude to cause a pulse in the AC voltage provided by AC source 12. The shunt circuit 32 includes an energy clamp circuit for limiting the amplitude and the duration of the current. A predetermined sequential pattern of pulses in the AC voltage corresponds to a predetermined message.

The system 10 also includes a plurality of receivers 20 connected downstream from the pulse transmitter 16. Each receiver 18 has a hot connection 26 that is couplable to the hot wire 14 of the AC source 12, and a neutral connection 28 that is couplable to the neutral wire 16 of AC source 12. In an alternative embodiment, as shown in FIG. 2, each receiver 18 further includes an earth ground terminal 96 that is connected to earth ground. Each receiver 18 is operable to detect pulses inserted in the AC voltage by the pulse transmitter 16 and to translate a predetermined sequential pattern of pulses into a corresponding predetermined message.

In one embodiment, the pulse transmitter 16 also includes an interface 34 for accepting a message provided by a user. The interface 34 accepts the user message and correspondingly signals the control circuit 30 to drive the shunt circuit 32 in such a way that the user message is translated into a corresponding series of pulses in the AC voltage.

Figure 3:
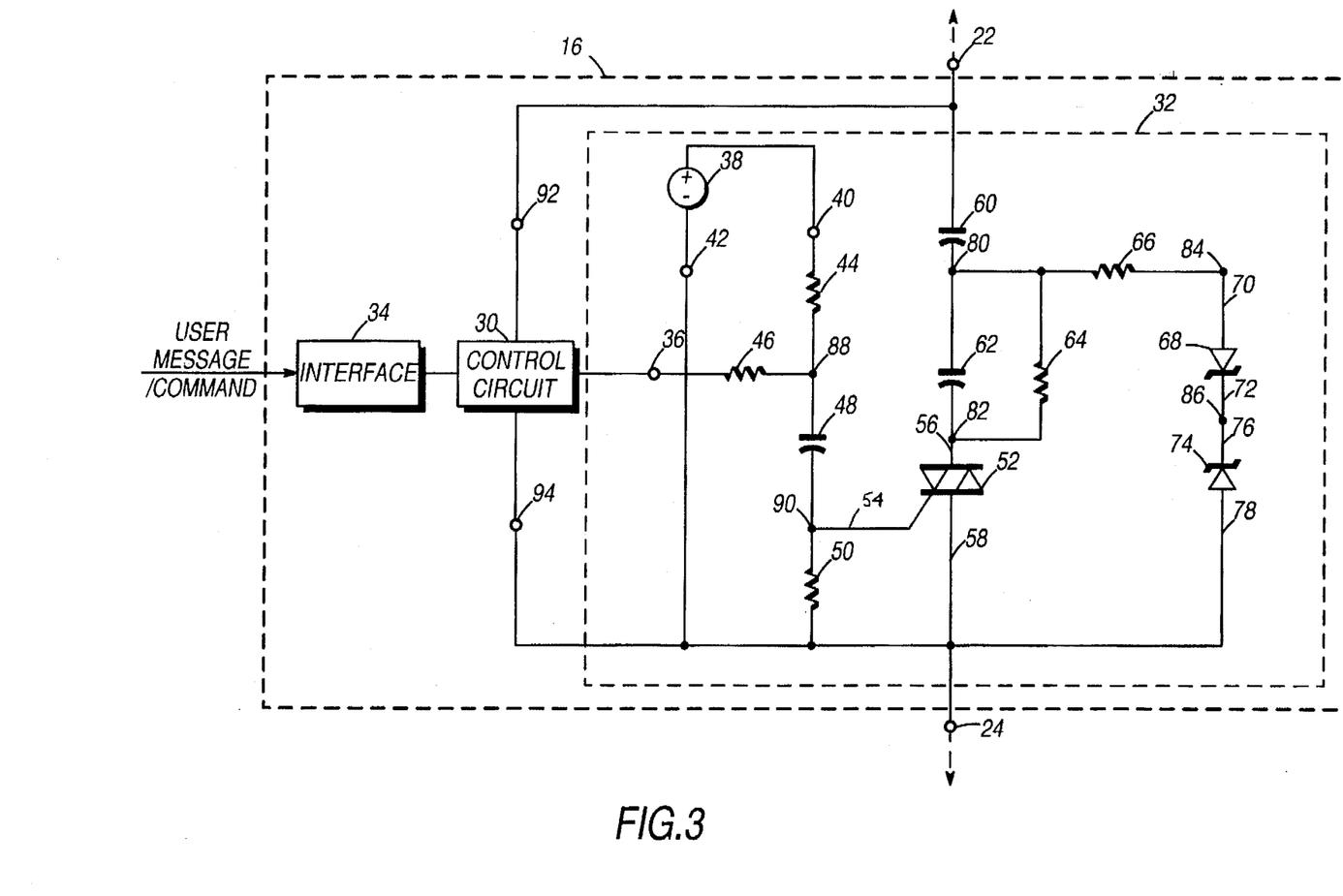
FIG. 3 is a schematic of a preferred embodiment of a pulse transmitter circuit, in accordance with the present invention.

A preferred embodiment of the pulse transmitter 16 is shown in FIG. 3. The pulse transmitter 16 comprises a control circuit 30 and a shunt circuit 32. The control circuit 30 includes a hot input 92 coupled to the hot terminal 22 of the pulse transmitter 16, a reference wire 94 connected to the reference terminal 24 of the pulse transmitter 16, and a trigger output 36.

The shunt circuit 32 comprises a source of direct current 38 having a positive output 40 and a reference output 42 that is connected to the reference terminal 24, a high frequency coupling capacitor 60 coupled between the hot terminal 22 and a first node 80, a first series circuit coupled between the first node 80 and the reference terminal 24, the first series circuit comprising a pulse energy limiting capacitor 62 and a power switch 52, an energy clamp circuit coupled between the first node 80 and the reference terminal 24, the energy clamp circuit including an energy clamp resistor 66, a first energy clamp zener diode 68, and a second energy clamp zener diode 74, each zener diode having an anode and a cathode, a second series circuit coupled between a fifth node 88 and the reference terminal 24, the second series circuit including a trigger energy storage capacitor 48 and a pull-down resistor 50, a trigger current limiting resistor 46 coupled between the fifth node 88 and the trigger output 36, a bias current source resistor 44 coupled between the fifth node 88 and the positive output 40 of the source of direct current 38, and a discharge resistor coupled between the first node 80 and a second node 82.

Referring again to FIG. 3, the power switch 52 has a first conduction terminal 56, a second conduction terminal 58, and a control terminal 54, the first conduction terminal 56 being coupled to the second node 82, the second conduction terminal 58 being coupled to the reference terminal 24, and the control terminal 54 being coupled to a sixth node 90. The pulse energy limiting capacitor 62 is coupled between the first node 80 and the second node 82. The energy clamp resistor 66 is coupled between the first node 80 and a third node 84. The anode 70 of the first energy clamp zener diode 68 is coupled to the energy clamp resistor 66 at the third node 84, and the cathode 72 of the first energy clamp zener diode 68 is coupled to the cathode 76 of the second energy clamp zener diode 74 at a fourth node 86. The anode 78 of the second energy clamp zener diode 74 is coupled to the reference terminal 24. The trigger energy storage capacitor 48 is coupled between the fifth node 88 and the sixth node 90. The pull-down resistor 50 is coupled between the sixth node 90 and the reference terminal 24.

The pulse transmitter 16 of FIG. 3 is operable to induce a pulse in the AC line voltage during either the positive half cycle, the negative half cycle, or both. As opposed to existing pulse transmission circuits, the circuit 16 of FIG. 3 can reliably induce a pulse at any point in a given half cycle of the AC line voltage, while at the same time limiting the resulting current which flows through the triac 52 to within a pre-determined limit set by the energy clamp circuit. In this way, the magnitude and width of the pulse in the AC line voltage is substantially fixed throughout a wide portion of the AC line voltage cycle. This is an advantageous feature in that the current and power stress experienced by the triac is well-controlled, allowing the use of a triac, or other power switch such as a field-effect transistor (FET), with far lower ratings and, consequently, smaller physical size than is required in prior art pulse transmitter circuits.

The operation of the pulse transmitter 16 shown in FIG. 3 is now described in detail. The triac 52 is triggered by the control circuit 30 to induce a pulse in the AC line voltage in the following manner. The voltage at the trigger output 36 of the control circuit 30 is normally held high at a level equal to that provided by dc source 38. Consequently, capacitor 48 is peak charged and no current flows into the control terminal 54 of the triac 52. Hence, triac 52 is initially off. When the voltage at the trigger output 36 is made to go low by appropriate action within control circuit 30, capacitor 48 begins to discharge through resistor 46, establishing a current flow out of control terminal 54, which turns triac 52 on. With triac 52 turned on, a current flows in the path from the hot terminal 22 through capacitor 60, capacitor 62, and triac 52 to reference terminal 24. The magnitude of the current is set by capacitors 60 and 62, and the current ceases to flow once capacitors 60 and 62 become fully charged. Upon return of trigger output 36 to its formerly high level, capacitor 48 will begin to charge up again. Once capacitor 48 peak charges, the current flowing in terminal 54 goes to zero and triac 52 is no longer capable of conducting. Once triac 52 turns off, capacitor 62 discharges through resistor 64 and thereby resets itself for inducing a subsequent pulse in the same fashion.

The function of the energy clamp circuit comprising resistor 66, zener diode 68, and zener diode 74 is to limit the magnitude and duration of the current which flows when triac 52 is triggered into the conduction mode. In one embodiment, the zener voltages of diodes 68 & 74 are chosen to be equal, thereby symmetrically limiting the peak magnitude of the voltage at node 80 to the zener voltage of the zener diodes. Resistor 66 limits the resulting current which flows through the zener diodes 68 & 74 when the AC line voltage exceeds the zener voltage of the zener diodes. In this way, prior to turning triac 52 on, capacitor 60 is precharged to a voltage equal to the difference between the AC line and the zener voltage. It is this pre-charging of capacitor 60 to a voltage that tracks the AC line voltage which is responsible for the fact that the peak value and the duration of the current which flows through the triac 52 when triggered, and thus the peak value and the duration of the pulse in the AC line voltage, remains substantially constant regardless of where the pulse occurs in the AC line cycle.

The peak value and the duration of the current which flows through triac 52 when triggered, and correspondingly the amplitude and the duration of the resulting pulse in the AC line voltage, is a function of the natural series impedance of the AC line source and the capacitance of capacitors 60 and 62. Specifically, an increase in the capacitance of either one or both of the capacitors produces an increase in the amplitude and width of the resulting pulse in the AC line voltage, while a decrease in either one or both of the capacitors produces a decrease in the amplitude and width of the pulse.

Figure 4:
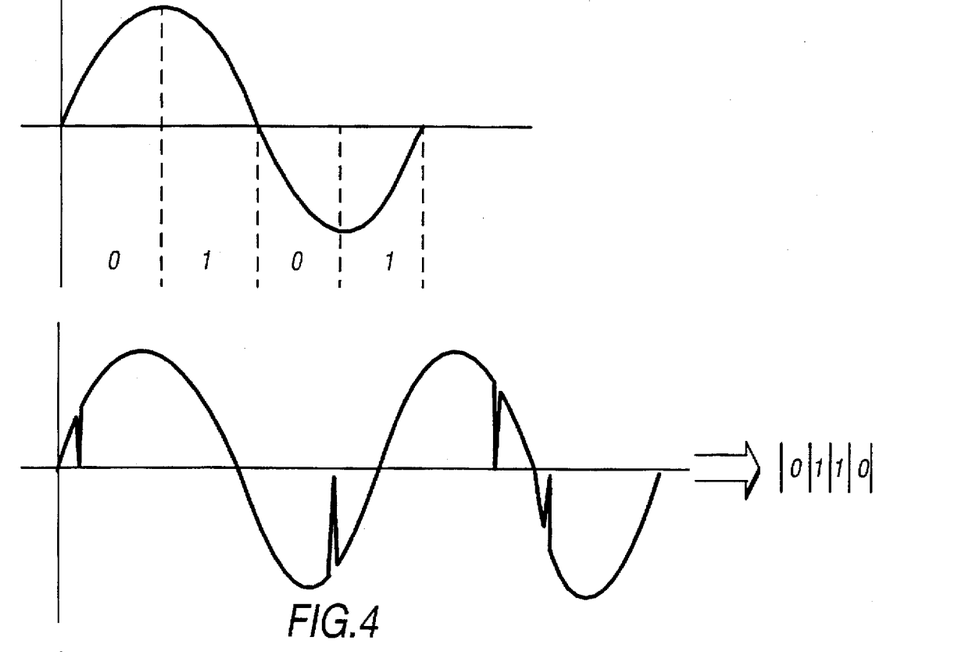
FIG. 4 shows an example of a bit assignment scheme in which each pulse in the AC voltage represents one bit, and in which a bit in the first or third quadrant of the cycle represents a logic "0" and a pulse in the second or fourth quadrant represents a logic "1," in accordance with the present invention.
Figure 5:
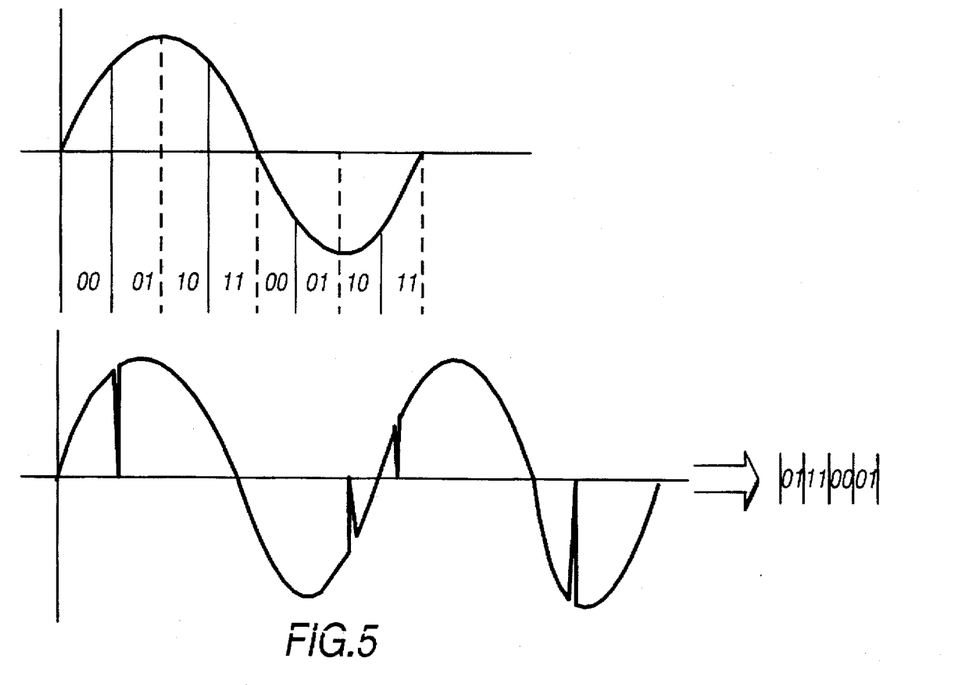
FIG. 5 shows an example of a second bit assignment scheme in which each pulse in the AC voltage represents two bits, in accordance with the present invention.

In general, the corresponding bit value assigned to a given pulse can be based upon either one or both of (1) the time of occurrence of the pulse in relation to when the AC voltage passes through zero, and (2) whether the pulse occurs during the positive half cycle or the negative half cycle of the AC voltage. Examples of possible bit value assignments are shown in FIGS. 4 and 5. FIG. 4 shows a bit assignment in which a pulse which occurs within the first or third quadrant of the AC line voltage cycle represents a logic "0", while a pulse which occurs within the second or fourth quadrant represents a logic "1." In this assignment, the bit value assigned to a pulse is purely a function of the time of occurrence of the pulse in relation to the most recent zero crossing of the AC line voltage, and the pulse transmitter is capable of transmitting up to two bits per AC line cycle. FIG. 5 shows an alternative bit assignment which divides each half cycle into four logic "zones", each zone representing a two bit value. Accordingly, with the pulse transmitter circuit of FIG. 3 being operable to induce one pulse per half cycle, the bit assignment of FIG. 5 allows for transmission of up to four bits per cycle, which amounts to twice the transmission rate obtained with the assignment in FIG. 4. In similar fashion, bit assignments which partition each half cycle into an even greater number of zones, such as eight zones and so forth, may be implemented in order to further increase the transmission rate.

Figure 6:
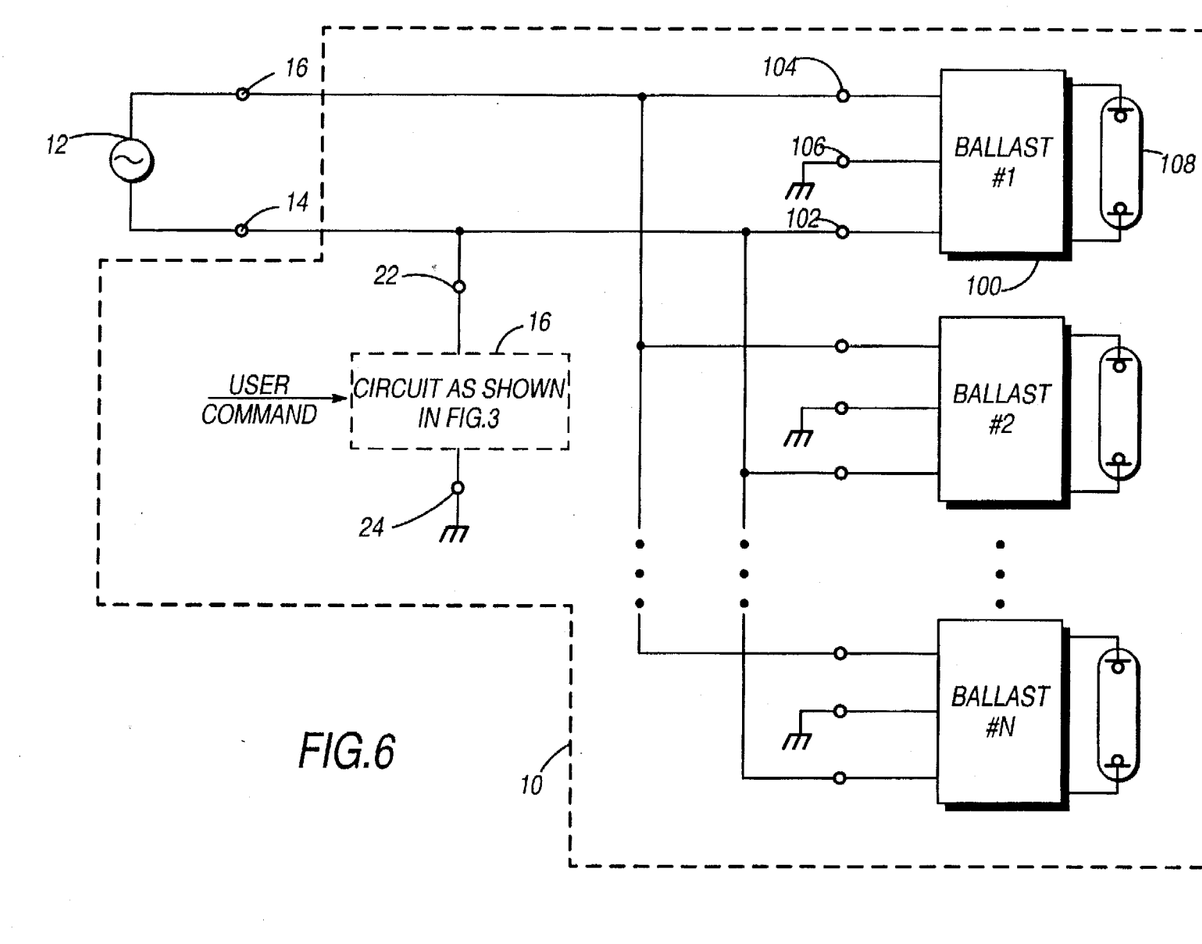
FIG. 6 is a diagram of a preferred embodiment of an energy control system which uses a pulse transmitter for controlling electronic ballasts for fluorescent lamps, in accordance with the present invention.

A preferred embodiment of the power-line communication system 10 as applied to the control of electronic ballasts for fluorescent lamps is shown in FIG. 6. All elements of the energy control system 10 are as described previously, with the addition of one or more controllable electronic ballasts, each ballast 100 having a hot input 102 that is couplable to the hot wire 14 of the AC source 12, a neutral input 104 that is couplable to the neutral wire 14 of the AC source 12, and an earth ground input 106 that is connected to earth ground. Each ballast 100 is adapted to light one or more fluorescent lamps 108, and includes a receiver that detects pulses in the AC voltage and translates a predetermined sequential pattern of such pulses into a corresponding control command for execution by the ballast 100.

In the embodiment shown in FIG. 6, the pulse transmitter 16 may be used to relay control commands to the ballasts. Desirable control commands may include functions such as instructing the ballasts, either individually or in groups, to turn on and off, to dim the lamps, to cause the lamps to flash, and so forth.

The present invention, as illustrated by the embodiments shown in the figures, offers several important advantages over the prior art. First and foremost is that it avoids the noise immunity problems inherent in high frequency carrier-based systems by using low frequency pulse transmission, but importantly offers a higher transmission rate than existing pulse methods by using the time of occurrence of a pulse in relation to the AC line zero crossing to determine the bit value assigned to the pulse. Secondly, the present invention involves a relatively simple and reliable pulse transmitter circuit 16 which is operable to induce pulses throughout a wide portion of the AC line cycle, thereby making possible the aforementioned bit value assignment scheme, which in turn allows for a higher transmission rate in comparison with existing pulse methods. Finally, due to the presence of an energy clamp circuit, the pulse transmitter circuit 16 requires a power switch with only modest current, voltage, and power ratings, thereby rendering the proposed circuit 16 much more practical, from the standpoint of cost, physical size, and reliability, than existing approaches.

Although the present invention has been described with reference to certain preferred embodiments, numerous modifications and variations can be made by those skilled in the art without departing from the novel spirit and scope of this invention.

What is claimed is:

1. A power-line communication system for use with a conventional AC source having a hot wire and a neutral wire, the system comprising:

a pulse transmitter having a hot terminal and a reference terminal, the hot terminal being couplable to the hot wire of the AC source and the reference terminal being connected to one of (i) earth ground and (ii) the neutral wire of the AC source, an AC voltage being present between the hot wire and the neutral wire of the AC source, the AC voltage having a positive half cycle and a negative half cycle, the pulse transmitter including a shunt circuit coupled between the hot terminal and the reference terminal, and a control circuit for rendering the shunt circuit conductive and non-conductive, wherein when the shunt circuit is conductive a current having an amplitude and a duration flows from the hot terminal to the reference terminal, the shunt circuit including an energy clamp circuit for limiting the amplitude and the duration of the current, the current being of sufficient amplitude to cause a pulse in the AC voltage, wherein a predetermined sequential pattern of pulses in the AC voltage corresponds to a predetermined message; and at least one receiver connected downstream from the pulse transmitter, the receiver having a hot connection and a neutral connection, the hot connection being couplable to the hot wire of the AC source and the neutral connection being couplable to the neutral wire of the AC source, the receiver being operable to detect pulses in the AC voltage and to translate a predetermined sequential pattern of pulses in the AC voltage into a corresponding predetermined message.

2. The system of claim 1, wherein each pulse represents a corresponding bit value, the corresponding bit value being dependent upon at least one of (i) the time of occurrence of the pulse in relation to when the AC voltage passes through zero and (ii) whether the pulse occurs during the positive half cycle or the negative half cycle of the AC voltage.

3. The system of claim 1, wherein the pulse transmitter further includes an interface for accepting a user message and is operable to translate a user message into a corresponding sequential pattern of pulses in the AC voltage.

4. The system of claim 1, wherein the pulse transmitter is operable to induce at least one pulse in at least one of (i) the positive half cycle of the AC voltage and (ii) the negative half cycle of the AC voltage.

5. The system of claim 1, wherein the duration of each pulse in the AC voltage is in the range of about 1 microsecond to about 100 microseconds.

6. The system of claim 1, wherein the pulse transmitter comprises:

the control circuit having a trigger output, a hot input, and a reference wire, the hot input being coupled to the hot terminal of the pulse transmitter, and the reference wire being connected to the reference terminal of the pulse transmitter;

the shunt circuit comprising:

a source of direct current having a positive output and a reference output, the reference output being connected to the reference terminal of the pulse transmitter;

a high frequency coupling capacitor coupled between the hot terminal and a first node;

a first series circuit coupled between the first node and the reference terminal, the first series circuit comprising a pulse energy limiting capacitor and a power switch coupled at a second node, the power switch having a first conduction terminal, a second conduction terminal, and a control terminal, the first conduction terminal being coupled to the second node and the second conduction terminal being coupled to the reference terminal of the pulse transmitter;

an energy clamp circuit coupled between the first node and the reference terminal, the energy clamp circuit comprising an energy clamp resistor, a first energy clamp zener diode, and a second energy clamp zener diode, the energy clamp resistor being coupled between the first node and a third node, the first and second energy clamp zener diodes each having an anode and a cathode, the anode of the first zener diode being coupled to the energy clamp resistor at the third node, the cathode of the first zener diode being coupled to the cathode of the second zener diode at a fourth node, and the anode of the second zener diode being coupled to the reference terminal;

a second series circuit coupled between a fifth node and the reference terminal, the second series circuit comprising a trigger energy storage capacitor and a pull-down resistor coupled at a sixth node, the sixth node being coupled to the control terminal of the power switch, the trigger energy storage capacitor being coupled between the fifth node and the sixth node, and the pull-down resistor being coupled between the sixth node and the reference terminal;

a trigger current limiting resistor coupled between the fifth node and the trigger output of the control circuit;

a bias current source resistor coupled between the fifth node and the positive output of the source of direct current; and a discharge resistor coupled between the first node and the second node.

7. The system of claim 6, wherein the power switch comprises a triac.

8. The system of claim 1, wherein each receiver further includes an earth ground terminal connected to earth ground.

9. An energy control system for use with a conventional AC source having a hot wire and a neutral wire, the system comprising:

a pulse transmitter having a hot terminal and a reference terminal, the hot terminal being couplable to the hot wire of the AC source and the reference terminal being connected to one of (i) earth ground and (ii) the neutral wire of the AC source, an AC voltage being present between the hot wire and the neutral wire of the AC source, the pulse transmitter including a shunt circuit coupled between the hot terminal and the reference terminal, and a control circuit for rendering the shunt circuit conductive and non-conductive, wherein when the shunt circuit is conductive a current having an amplitude and a duration flows from the hot terminal to the reference terminal, the shunt circuit including an energy clamp circuit for limiting the amplitude and duration of the current, the current being of sufficient amplitude to cause a pulse in the AC voltage, wherein a predetermined sequential pattern of pulses in the AC voltage corresponds to a predetermined control command; and at least one controllable load connected downstream from the pulse transmitter, the load having a hot connection and a neutral connection, the hot connection being couplable to the hot wire of the AC source and the neutral connection being couplable to the neutral wire of the AC source, the load including a receiver, the receiver being operable to detect pulses in the AC voltage and to translate a predetermined sequential pattern of pulses in the AC voltage into a corresponding predetermined control command to be executed by the load.

10. The system of claim 9, wherein each pulse represents a corresponding bit value, the corresponding bit value being dependent upon at least one of (i) the time of occurrence of the pulse in relation to when the AC voltage passes through zero and (ii) whether the pulse occurs during the positive half cycle or the negative half cycle of the AC voltage.

11. The system of claim 9, wherein the pulse transmitter further includes an interface for accepting user commands and is operable to translate a user command into a corresponding sequential pattern of pulses in the AC voltage.

12. The system of claim 9, wherein the pulse transmitter is operable to induce at least one pulse in at least one of (i) the positive half cycle of the AC voltage and (ii) the negative half cycle of the AC voltage.

13. The system of claim 9, wherein the duration of each pulse in the AC voltage is in the range of about 1 microsecond to about 100 microseconds.

14. The system of claim 9, wherein the pulse transmitter comprises:

the control circuit having a trigger output, a hot input, and a reference wire, the hot input being coupled to the hot terminal of the pulse transmitter, and the reference wire being connected to the reference terminal of the pulse transmitter;

the shunt circuit comprising:

a source of direct current having a positive output and a reference output, the reference output being connected to the reference terminal of the pulse transmitter;

a high frequency coupling capacitor coupled between the hot terminal and a first node;

a first series circuit coupled between the first node and the reference terminal, the first series circuit comprising a pulse energy limiting capacitor and a power switch coupled at a second node, the power switch having a first conduction terminal, a second conduction terminal, and a control terminal, the first conduction terminal being coupled to the second node, and the second conduction terminal being coupled to the reference terminal of the pulse transmitter;

an energy clamp circuit coupled between the first node and the reference terminal, the energy clamp circuit comprising an energy clamp resistor, a first energy clamp zener diode, and a second energy clamp zener diode, the energy clamp resistor being coupled between the first node and a third node, the first and second energy clamp zener diodes each having an anode and a cathode, the anode of the first zener diode being coupled to the energy clamp resistor at the third node, the cathode of the first zener diode being coupled to the cathode of the second zener diode at a fourth node, and the anode of the second zener diode being coupled to the reference terminal;

a second series circuit coupled between a fifth node and the reference terminal, the second series circuit comprising a trigger energy storage capacitor and a pull-down resistor coupled at a sixth node, the sixth node being coupled to the control terminal of the power switch, the trigger energy storage capacitor being coupled between the fifth node and the sixth node, and the pull-down resistor being coupled between the sixth node and the reference terminal;

a trigger current limiting resistor coupled between the fifth node and the trigger output of the control circuit;

a bias current source resistor coupled between the fifth node and the positive output of the source of direct current; and a discharge resistor coupled between the first node and the second node.

15. The system of claim 14, wherein the power switch comprises a triac.

16. The system of claim 9, wherein each load further includes an earth ground terminal connected to earth ground.

17. The system of claim 16, wherein at least one controllable load comprises a controllable electronic ballast adapted to light at least one fluorescent lamp.

18. The system of claim 17, wherein the pulse transmitter and the controllable electronic ballasts are operable to turn the fluorescent lamps on and off.

19. The system of claim 17, wherein the pulse transmitter and the controllable electronic ballasts are operable to vary the illumination level of the fluorescent lamps.

20. An energy control system for use with a conventional AC source having a hot wire and a neutral wire, the system comprising:

a pulse transmitter having a hot terminal and a reference terminal, the hot terminal being coupled to the hot wire of the AC source and the reference terminal being connected to earth ground, an AC voltage being present between the hot wire and the neutral wire of the AC source, the AC voltage including a positive half-cycle and a negative half-cycle, the pulse transmitter including a shunt circuit coupled between the hot terminal and the reference terminal, and a control circuit for rendering the shunt circuit conductive and non-conductive, wherein when the shunt circuit is conductive a current having an amplitude and a duration flows from the hot terminal to the reference terminal, the shunt circuit including an energy clamp circuit for limiting the amplitude and the duration of the current, the current being of sufficient amplitude to cause a momentary pulse in the AC voltage, the duration of the pulse being in the range of about 1 microsecond to about 100 microseconds, the pulse transmitter being operable to induce at least one pulse in at least one of (i) the positive half cycle of the AC voltage and (ii) the negative half cycle of the AC voltage, each pulse representing a corresponding bit value, the corresponding bit value being dependent upon at least one of (i) the time of occurrence of the pulse in relation to when the AC voltage passes through zero and (ii) whether the pulse occurs in the positive half cycle or the negative half cycle of the AC voltage, wherein a predetermined sequential pattern of pulses in the AC voltage corresponds to a predetermined control command;

at least one controllable electronic ballast connected downstream from the pulse transmitter, the ballast being adapted to light at least one fluorescent lamp, the ballast having a hot connection, a neutral connection, and an earth ground connection, the hot connection being coupled to the hot wire of the AC source, the neutral connection being coupled to the neutral wire of the AC source, and the earth ground connection being connected to earth ground, the ballast including a receiver, the receiver being operable to detect pulses in the AC voltage and to translate a predetermined sequential pattern of pulses in the AC voltage into a corresponding predetermined control command to be executed by the ballast;

the pulse transmitter further including an interface for accepting user commands and being further operable to translate a user command into a corresponding sequential pattern of pulses in the AC voltage;

the control circuit having a trigger output, a hot input, and a reference wire, the hot input being coupled to the hot terminal of the pulse transmitter, and the reference wire being connected to the reference terminal of the pulse transmitter;

the shunt circuit comprising:

a source of direct current having a positive output and a reference output, the reference output being connected to the reference terminal of the pulse transmitter;

a high frequency coupling capacitor coupled between the hot terminal and a first node;

a first series circuit coupled between the first node and the reference terminal, the first series circuit comprising a pulse energy limiting capacitor and a power switch coupled at a second node, the power switch having a first conduction terminal, a second conduction terminal, and a control terminal, the first conduction terminal being coupled to the second node, and the second conduction terminal being coupled to the reference terminal of the pulse transmitter;

an energy clamp circuit coupled between the first node and the reference terminal, the energy clamp circuit comprising an energy clamp resistor, a first energy clamp zener diode, and a second energy clamp zener diode, the energy clamp resistor being coupled between the first node and a third node, the first and second energy clamp zener diodes each having an anode and a cathode, the anode of the first zener diode being coupled to the energy clamp resistor at the third node, the cathode of the first zener diode being coupled to the cathode of the second zener diode at a fourth node, and the anode of the second zener diode being coupled to the reference terminal;

a second series circuit coupled between a fifth node and the reference terminal, the second series circuit comprising a trigger energy storage capacitor and a pull-down resistor coupled at a sixth node, the sixth node being coupled to the control terminal of the power switch, the trigger energy storage capacitor being coupled between the fifth node and the sixth node, and the pull-down resistor being coupled between the sixth node and the reference terminal;

a trigger current limiting resistor coupled between the fifth node and the trigger output of the control circuit;

a bias current source resistor coupled between the fifth node and the positive output of the source of direct current; and a discharge resistor coupled between the first node and the second node;

the power switch comprising a triac; and the pulse transmitter and the controllable electronic ballasts being operable to vary the illumination level of the fluorescent lamps and to turn the fluorescent lamps on and off.

* * * * *